A. COLLIGNON.
RECLINING CHAIR.
No. 10,165. Reissued July 18, 1882.
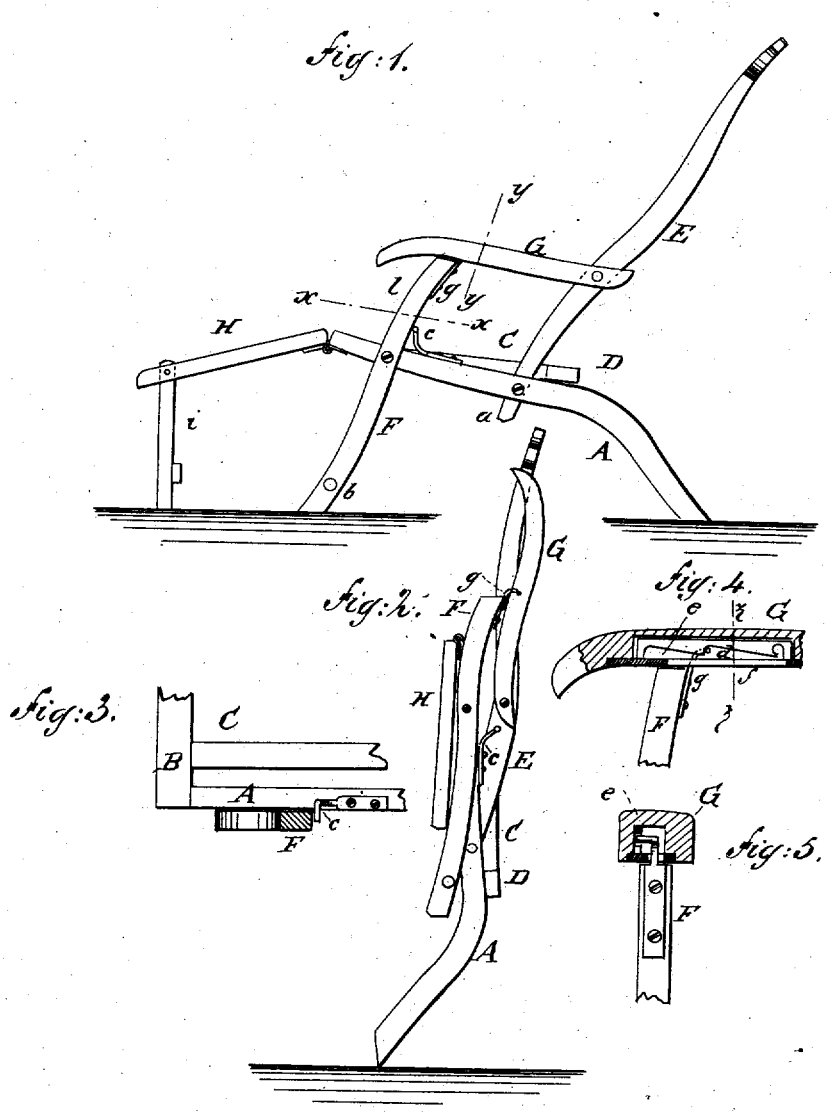
WITNESSES:
Chas. Nichols
C. Sedgwick
INVENTOR:
A. Collignon
BY Munn & Co
ATTORNEYS.
N. PETERS, Photo-Lithographer, Washington, D. C.

UNITED STATES PATENT OFFICE.

ADAM COLLIGNON, OF WESTWOOD, NEW JERSEY.

RECLINING-CHAIR.

SPECIFICATION forming part of Reissued Letters Patent No. 10,165, dated July 18, 1882.

Original No. 201,912, dated April 2, 1878. Application for reissue filed August 29, 1881.

*To all whom it may concern:*

Be it known that I, ADAM COLLIGNON, of Westwood, in the county of Bergen and State of New Jersey, have invented a new and useful Improvement in Reclining-Chairs, of which the following is a full, clear, and exact specification.

Figure 1 is a side elevation of my improved chair, showing it in position for use. Fig. 2 is a side elevation of the chair when folded. Fig. 3 is a detail section taken on line *x x* of Fig. 1. Fig. 4 is a longitudinal section of one of the arms, showing the construction of the ratchet and pawl. Fig. 5 is a transverse section on line *y y* in Fig. 1 and line *z z* in Fig. 4.

Similar letters of reference indicate corresponding parts.

The object of my invention is to provide a reclining-chair that may be easily adjusted to several positions.

Referring to the drawings, A is a curved side piece, which also forms the rear leg of the chair, and also the side rail for supporting the bottom. This curved side piece is framed into the front bar, B, into which the side pieces of the bottom frame, C, are framed. The rear ends of these pieces are framed into a cross-bar, D, that rests on the curved side pieces, A.

Between the curved side pieces, A, and the side pieces of the frame C the back-supports E are pivoted at *a* in front of the rear cross-bar, D.

Near the front end of the curved side pieces, A, the front or arm-supporting legs, F, are pivoted. These legs are connected below the bottom by a round, *b*, and they extend above the side pieces, A, sufficiently to form a support, *l*, for the forward end of arm G, the rear end of such arm being pivoted to the back-support E.

Upon the top of the curved side piece, A, near the pivot of leg F, a stop, *c*, is secured. This stop consists of a piece of iron which is screwed to the side piece, and is bent upward to remove it from the pivot of the leg, and is bent outward at right angles to engage with the back of leg F.

A recess, *d*, is formed in the under surface of the arm to receive a ratchet-bar, *e*, which is attached to a slotted plate, *f*, that is secured to the under surface of the arm. The ratchet-bar is located at one side of the slot in the plate, with its notched edge facing the plate.

The pawl *g*, which is attached to the support *l* of the arm and engages the ratchet-bar *e*, consists of a plate that is screwed to the back of the arm-support and has formed on it a finger that projects through the slotted plate *f*, and is curved rearwardly and bent at right angles to engage the ratchet-bar. The curving of pawl *g* permits of folding the chair.

The ordinary leg-rest, H, having the folding support *i*, is hinged to the front bar, B, and folds with the other parts of the chair.

By raising the arms G and shifting the ratchet on the pawl the back of the chair may be adjusted to any desired inclination. When the back E is placed as far back as possible it rests against the cross-bar D.

Having thus fully described my invention, I claim as new and desire to secure by Letters Patent—

In a folding chair, the combination of the side pieces, A, provided with stops *c*, the back pieces, E, pivoted to the side pieces, arms G, pivoted to the back pieces, the legs F, having arm-supports *l*, pivoted to the side pieces, and ratchet devices *e g*, substantially as herein shown and described.

A. COLLIGNON.

Witnesses:
GEO. D. WALKER,
C. SEDGWICK.